March 24, 1936. E. H. HARRISON 2,035,368
CREAM SALVAGING AND UTENSIL CLEANSING APPARATUS
Filed Sept. 21, 1935
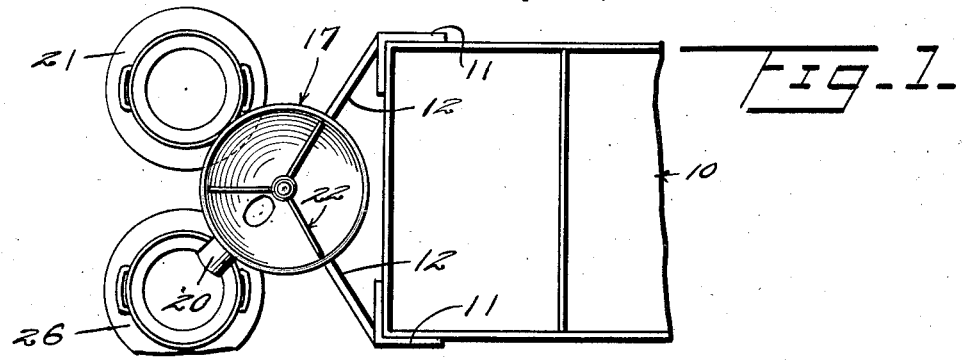
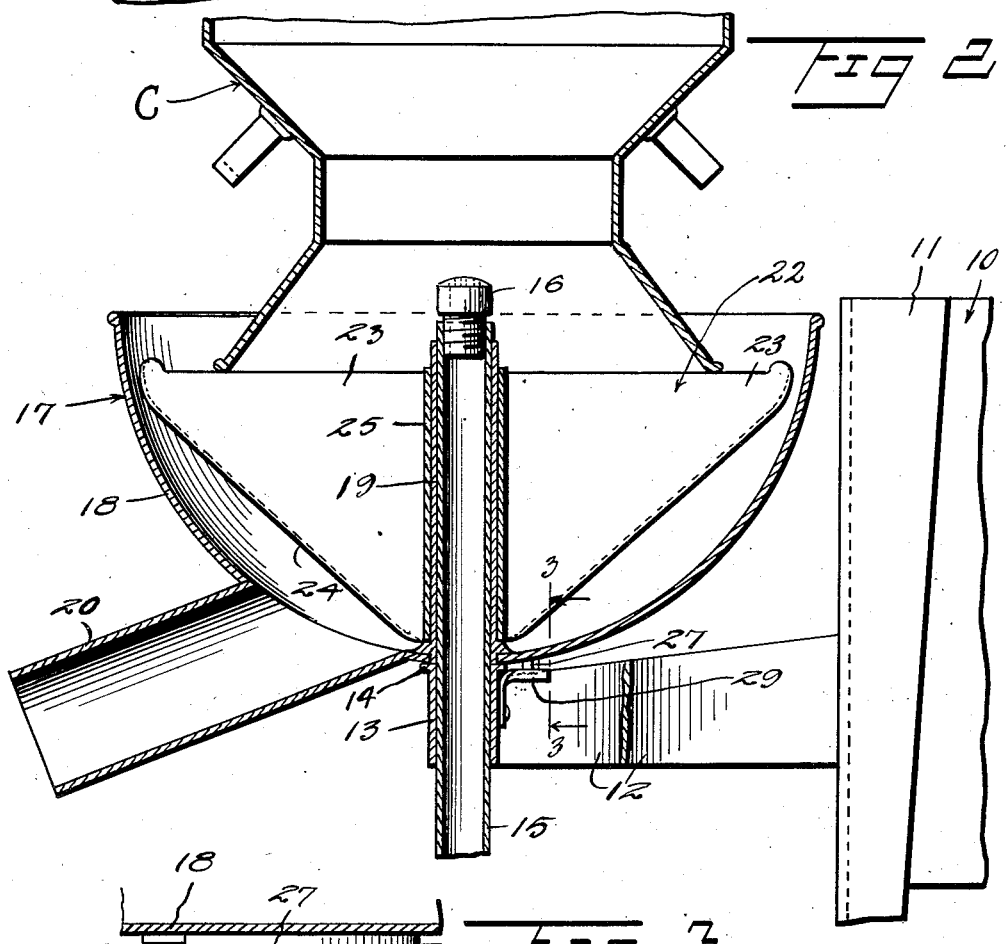
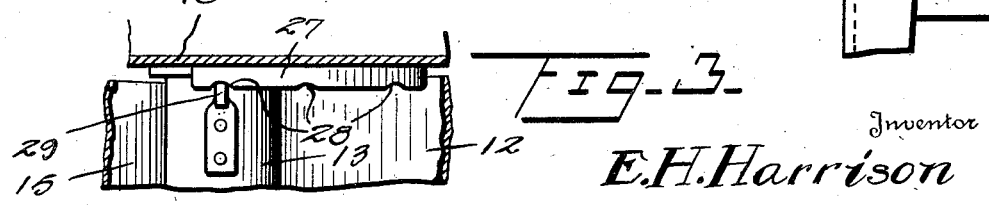
Inventor
E. H. Harrison
By Watson E. Coleman
Attorney Patented Mar. 24, 1936

2,035,368

UNITED STATES PATENT OFFICE 2,035,368

CREAM SALVAGING AND UTENSIL CLEANSING APPARATUS

Everett H. Harrison, Wichita, Kans., assignor to Fred Mankoff, Wichita, Kans.

Application September 21, 1935, Serial No. 41,633

2 Claims. (Cl. 141—7)

This invention relates to cleaning devices and more particularly to a milk can cleaning and recovering device, and is an improvement over the construction embodied in my Patent No. 1,943,602 which issued on January 16, 1934.

An object of this invention is to provide an improved can steaming device which is so constructed that the can may be supported in an inverted position in which position the inside of the can is initially steamed to recover the curd or cream adhering to the inside of the can, the device being so constructed that it can be easily cleaned and so that the cream and curd drained out of the can will not cake or otherwise stick to inaccessible parts of the device.

Another object of this invention is to provide a device of this kind which is adapted to be used in conjunction with at least two receptacles or cans receiving the drainings from the can which is being cleaned, one of the receptacles being adapted to receive the initial drainings from the uncleaned can, whereas the other receptacle is adapted to receive the drainings from the can after the inside of the can has been washed with a cleansing means so that the curd and cream removed from the inside of the can in the initial operation will not be mixed with the cleaning compound.

A further object of this invention is to provide a device of this kind which is so constructed that it can be easily sterilized in order that the device may pass the increasingly rigid sanitation regulations being inaugurated in various communities and States.

The above and various other objects and advantages of this invention will in part be described in, and in part be understood from the following detail description of the present preferred embodiment, the same being illustrated in the accompanying drawing wherein:

Figure 1 is a fragmentary top plan of a steaming device having a device constructed according to this invention mounted thereon;

Figure 2 is an enlarged vertical section partly broken away and in side elevation of the device;

Figure 3 is a fragmentary sectional view taken on the line 3—3 of Figure 2.

Referring to the drawing wherein like numerals of reference designate corresponding parts throughout the several parts, the numeral 10 designates generally a tank structure of the type embodied in the patent above indicated which is supported on legs or supporting members 11.

Due to the tendency of the authorities in communities and States to increase the sanitation regulations at creameries which regulations are of such a character that all articles used in the handling of cream and milk must be thoroughly cleansed and all corners or angles of the receptacles used for handling milk and cream eliminated, it is necessary to redesign such devices. It is, therefore, an object of this invention not only to provide a can cleaning means in which all corners are eliminated but also in which the steam pipe used for the cleaning operation is surrounded by a cylindrical shield or sleeve so that none of the ingredients in the cream or milk will pack on the pipe and, therefore, render this pipe insanitary.

The tank 10 supported on the frame or leg structure 11 is provided at one end with a stationary V-shaped bracket 12 which is secured to one end of the frame or leg structure 11 preferably below the top of the tank 10, although this supporting structure 12 may be disposed at any desired position on the frame or leg structure 11. The convergent ends of the bracket members or arms 12 are secured to a thimble 13 having a flange or bearing plate 14 at its upper end. A steam pipe 15 is adapted to extend vertically through the thimble 13 and adapted to be connected to a suitable source of steam supply similar to that embodied in the above mentioned patent. The pipe 15 extends upwardly above the supporting structure 12 and terminates in a nozzle or steam jet 16 of suitable construction which is of a sufficient height to extend partly into the interior of a milk can C which is disposed in inverted position as will be hereinafter described.

A hopper or receiving member generally designated as 17 is mounted on the supporting structure 12 and comprises a bowl 18 of rounded construction in transverse section which has a vertically disposed sleeve 19 secured to the center thereof and which snugly encircles and encloses the steam pipe 15. This bowl 18 is substantially larger than the rim of a milk can so that when the can C is disposed in inverted position, all of the dissolved liquids in the can C will drain downwardly into the bowl 18 and will then pass out through a discharge spout 20 which is connected at one end to the bowl 18 and disposed on a downward inclination. This spout or drainpipe 20 is adapted to drain into a receiving can 21 which is disposed below the spout 20. A spider or can supporting rack 22 is disposed within the bowl 17 and comprises a plurality of radially arranged vanes or arms 23 provided with horizontal upper edges and obliquely disposed and preferably straight lower edges 24 which are spaced from the wall of the bowl so that none of the liquids drained out of the can C will be trapped by these arms 23. The radial arms 23 are secured at their inner ends to a tubular member 25 which loosely engages about the sleeve 19 and the bottom of this tubular member 25 rests on the bottom of the bowl 17. It will be understood that this can supporting rack 22 may be freely rotated with respect to the bowl 17.

When the loosened material has been drained out of the can C under the action of the steam from the jet 16 the bowl 17 with the draining nozzle 20 is turned so that the nozzle 20 will discharge into a second can 26. The bowl 17 is provided on the bottom thereof, with a notched segmental member or bar 27 which is provided with a plurality of notches 28 in a selected one of which an outstanding locking lug 29 carried by the thimble 13 is adapted to engage. In other words the bowl 17 during the first cleaning operation is turned so that the spout 20 will drain into the can 21 and in this position the locking member 29 will be disposed in one notch 28 and hold the bowl 17 against rotation. After the first steaming operation the can C is removed from the supporting rack 22 and taken to the tank 10 where both the inside and the outside of the can are scoured by suitable scouring means. When this operation has been completed the can C is returned to the rack 22 and at this time the bowl 17 is raised to release the bar 27 from the lug 29 and the bowl is turned sufficiently to dispose the nozzle 20 in a position to discharge into the can 26. In this position the bowl 17 will be locked by the lug 29 engaging in another notch 28.

After the cleansing operations have been completed the bowl 17 with the rack 22 may be lifted off of the support 12 and scoured or otherwise cleaned so that there will not be any material adhering to the metal forming the bowl or to the supporting rack 22. It will be apparent, therefore, that an exceedingly simple can supporting means has been disclosed which will permit a cleaning of the interior of the can under the action of steam so that when the can is finally cleaned it will not be necessary to insert any wiping devices or the like into the interior of the can. This cleaning means is designed to eliminate all possible corners which have a tendency to collect residue and which render devices heretofore available insanitary and unacceptable to communities having rigid sanitation regulations. The steam pipe 15 is substantially enclosed by the sleeve 19 so that only the jet portion 16 of the steaming device will extend out of the bowl and by reason of this construction none of the cream or other matter drained out of the can C will adhere to and become packed upon the exterior of the steam pipe 15. This nozzle 16 is of a removable type, being threaded or otherwise secured to the upper end of the steam pipe 15.

I claim:—

1. In a can cleaning apparatus, a vertically disposed and upwardly opening steam pipe, a support therefor including a bracket embodying a thimble through which said pipe upwardly extends, a bowl supported on said thimble, and provided with a vertically extended centrally disposed sleeve snugly enclosing said pipe, a can support embodying radially disposed arms and a central tubular body connecting said arms and encircling said sleeve, the thimble being provided with a locking lug and the bowl being provided with a notched bar designed to engage said lug to hold the bowl in predetermined position as against rotation.

2. In a can cleaning apparatus, a supporting bracket embodying a thimble, a vertically disposed and upwardly opening steam pipe extending through said thimble, a bowl mounted on said thimble and provided with a centrally disposed sleeve encircling and enclosing said pipe, means for supporting said bowl on the thimble in different rotative positions, and a can support comprising radially disposed arms, and a centrally disposed tubular supporting member encircling said sleeve and supported within the bowl, said radial arms being provided with horizontally disposed upper edges and with obliquely disposed lower edges, which latter are spaced from the inner wall of the bowl.

EVERETT H. HARRISON.